United States Patent
Lee

(10) Patent No.: US 9,007,737 B2
(45) Date of Patent: Apr. 14, 2015

(54) OVERVOLTAGE PROTECTION CIRCUIT AND METHOD THEREOF

(71) Applicant: Samsung Electro-Mechanics Co., Ltd., Suwon-si, Gyeonggi-do (KR)

(72) Inventor: Soo Woong Lee, Suwon-si (KR)

(73) Assignee: Samsung Electro-Mechanics Co., Ltd, Gyeonggi-Do (KR)

( * ) Notice: Subject to any disclaimer, the term of this patent is extended or adjusted under 35 U.S.C. 154(b) by 98 days.

(21) Appl. No.: 13/801,808

(22) Filed: Mar. 13, 2013

(65) Prior Publication Data
US 2013/0335873 A1    Dec. 19, 2013

(30) Foreign Application Priority Data
Jun. 18, 2012 (KR) .................. 10-2012-0064941

(51) Int. Cl.
  *H02H 3/20* (2006.01)
  *H02H 9/04* (2006.01)
(52) U.S. Cl.
  CPC ............ *H02H 9/041* (2013.01); *H02H 3/202* (2013.01); *H02H 3/20* (2013.01)
(58) Field of Classification Search
  CPC .......... H02H 3/20; H02H 3/202; H02H 9/041
  USPC ............................................... 361/91.1, 91.2
  See application file for complete search history.

(56) References Cited

U.S. PATENT DOCUMENTS

| | | | | |
|---|---|---|---|---|
| 4,949,139 | A | * | 8/1990 | Korsh et al. .................. 327/391 |
| 5,555,148 | A | * | 9/1996 | Matsuzaki et al. ............ 361/15 |
| 6,486,727 | B1 | * | 11/2002 | Kwong ........................ 327/534 |
| 8,582,259 | B2 | * | 11/2013 | Murakami et al. ............ 361/56 |

FOREIGN PATENT DOCUMENTS

| | | | |
|---|---|---|---|
| JP | 2007-096400 | A | 4/2007 |
| JP | 2009-200502 | A | 9/2009 |
| KR | 10-2007-0098312 | A | 10/2007 |
| KR | 1020070120910 | A | 12/2007 |
| KR | 1020080041190 | A | 5/2008 |

(Continued)

OTHER PUBLICATIONS

JP 2013-090041 Office Action dated Feb. 4, 2014; 2pgs.

(Continued)

*Primary Examiner* — Zeev V Kitov
(74) *Attorney, Agent, or Firm* — Bracewell & Giuliani LLP; Brad Y. Chin

(57) ABSTRACT

The overvoltage protection circuit in accordance with the present invention includes a resistor divider, a reference voltage supply unit, a comparator, and an inverter, wherein the inverter consists of a series-parallel combination circuit of first to third semiconductor switching elements which are driven by receiving an output of the comparator and the first semiconductor switching element and the second semiconductor switching element or the third semiconductor switching element are driven by receiving the output of the comparator, output an external voltage when the external voltage is within the range of the voltage required for an internal circuit, and flow the external voltage to a ground and thus make the voltage supplied to the internal circuit 0(zero)V to protect the internal circuit from an external overvoltage when the external voltage is a voltage (overvoltage) higher than the required voltage for the internal circuit.

9 Claims, 4 Drawing Sheets

(56) References Cited

FOREIGN PATENT DOCUMENTS

| KR | 10-2009-0061334 A | 6/2009 |
| KR | 1020100083871 A | 7/2010 |

OTHER PUBLICATIONS

KR 10-2012-0064941 Notice of Allowance dated Jun. 24, 2014; 2pgs.

* cited by examiner

- PRIOR ART -

US 9,007,737 B2

OVERVOLTAGE PROTECTION CIRCUIT AND METHOD THEREOF

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2012-0064941, entitled filed Jun. 18, 2012, which is hereby incorporated by reference in its entirety into this application.

BACKGROUND OF THE INVENTION

1. Field of the Invention

The present invention relates to an overvoltage protection circuit and a method thereof, and more particularly, to an overvoltage protection circuit that can be simply implemented in an integrated circuit (IC) and safely protect a circuit from an overvoltage input from the outside, and a method thereof.

2. Description of the Related Art

In recent times, electronic devices with secondary batteries, such as mobile phones and digital cameras, are being widely used. When an AC adapter is connected to such a device, the device can be operated by electric power supplied from the AC adapter and the secondary battery can be charged at the same time. As such devices have been widely used, various AC adapters having different output voltages have been used. Since limited types of connectors are available for the AC adapters, the AC adapters that output different voltages may have the same type of connector. Therefore, an improper AC adapter may be connected to an electronic device by mistake.

For example, when an AC adapter, which outputs a voltage higher than an endurance voltage of a semiconductor device of an arbitrary electronic device, is connected to the electronic device, the semiconductor device may be damaged or broken.

All circuits should operate within the specified power voltage range. A power voltage over the specified range is referred to as an overvoltage. The circuit may be shut down or breakdown of the circuit may occur due to the influence of the overvoltage. Therefore, each system uses an overvoltage protection circuit to prevent introduction of an input voltage higher than an operable power voltage. Particularly, when the overvoltage protection circuit is implemented in an integrated circuit (IC), there is a difficulty in being applied to the IC due to an increase in area by a diode, a high voltage transistor, etc.

RELATED ART DOCUMENT

Patent Document

Patent Document 1: Korean Patent Laid-open Publication No. 10-2008-0041190
Patent Document 2: Korean Patent Laid-open Publication No. 10-2010-0083871

SUMMARY OF THE INVENTION

The present invention has been invented in order to overcome the above-described problems and it is, therefore, an object of the present invention to provide an overvoltage protection circuit that can be simply implemented in an IC and safely protect a circuit from an overvoltage by precisely controlling the overvoltage input from the outside, and a method thereof.

In accordance with one aspect of the present invention to achieve the object, there is provided an overvoltage protection circuit including: a resistor divider consisting of a plurality of resistors, receiving a voltage from an external power supply, dropping the received voltage, dividing the dropped voltage into the voltages having a relatively smaller size than a power voltage, and providing the divided voltage; a reference voltage supply unit for supplying a preset reference voltage having a certain size; a comparator for receiving and comparing the voltage divided and provided by the resistor divider and the reference voltage supplied from the reference voltage supply unit and outputting a low or high signal according to the result of the comparison; and an inverter for receiving the output signal (low or high) of the comparator and outputting a signal (high or low) opposite to the output signal of the comparator, wherein the inverter includes a first semiconductor switching element having one side electrode terminal connected to the external power supply and driven by receiving the output of the comparator; a second semiconductor switching element connected to the first semiconductor switching element in series and driven by receiving the output of the comparator; and a third semiconductor switching element provided between the first semiconductor switching element and the second semiconductor switching element to be connected to the first semiconductor switching element in parallel to the second semiconductor switching element and driven by receiving the output of the comparator, wherein the first semiconductor switching element and the second semiconductor switching element or the third semiconductor switching element are driven by receiving the output of the comparator, output the external voltage when the external voltage is within the range of the voltage required for an internal circuit, and flow the external voltage to a ground GND and thus make the voltage supplied to the internal circuit 0(zero)V to protect the internal circuit from an external overvoltage when the external voltage is a voltage (overvoltage) higher than the required voltage for the internal circuit.

Here, the resistor divider may consist of a first resistor of which one end is connected to the external power supply and the other end is connected to a common mode for voltage division and a second resistor of which one end is connected to the common mode and the other end is connected to the ground.

Further, the comparator receives and compares the voltage (external voltage) provided by the resistor divider and the reference voltage supplied from the reference voltage supply unit, outputs the low signal when the external voltage is lower than the reference voltage, and outputs the high signal when the external voltage is higher than the reference voltage.

Further, the first to third semiconductor switching elements may be field effect transistors (FET).

Preferably, the first to third semiconductor switching elements are metal-oxide semiconductor field effect transistors (MOSFET).

Further, preferably, the first semiconductor switching element is a high voltage MOSFET. This is to endure an impact when a high external power voltage is applied.

Further, in accordance with another aspect of the present invention to achieve the object, there is provided an overvoltage protection method using an overvoltage protection circuit including a resistor divider, a reference voltage supply unit, a comparator, and an inverter, including: (a) receiving and comparing a voltage (external voltage) provided by the resistor divider and a reference voltage supplied from the reference voltage supply unit by the comparator; (b) outputting a low or high signal according to the result of the comparison by the comparator; (c) receiving the output signal (low or high) of the comparator and outputting a signal (high or low) opposite to the output signal of the comparator by the inverter; (d) outputting the external voltage to an internal circuit by determining that the external voltage is within the range of the voltage required for the internal circuit when the high signal is output from the inverter; and (e) flowing the external voltage to a ground to make the voltage supplied to the internal circuit 0(zero)V by determining the external voltage as a voltage (overvoltage) higher than the voltage required for the internal circuit when the low signal is output from the inverter.

Here, in the step (b), as a result of the comparison, the comparator outputs the low signal when the external voltage is lower than the reference voltage and outputs the high signal when the external voltage is higher than the reference voltage.

Further, in the step (d), the inverter drives a first semiconductor switching element and a second semiconductor switching element inside thereof to output the external voltage to the internal circuit.

Further, in the step (e), the inverter drives the first semiconductor switching element and a third semiconductor switching element thereof to flow the external voltage to the ground and thus make the voltage supplied to the internal circuit 0(zero)V.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

The terms or words used in the present specification and claims should not be interpreted as being limited to typical or dictionary meanings, but should be interpreted as having meanings and concepts relevant to the technical spirit of the present invention based on the rule according to which an inventor can appropriately define the concept of the term to describe his/her own invention in the best manner.

Throughout the specification, when an element is referred to as "including" another element, it can further include the other element rather than exclude the other element unless the context clearly indicates otherwise. Further, the terms "unit", "module", "apparatus", etc. used in the present specification represent a unit for processing at least one function or operation and may be implemented by hardware, software, or a combination thereof.

Hereinafter, embodiments of the present invention will be described in detail with reference to the accompanying drawings.

Here, before the full description of the embodiments of the present invention, an example of a conventional overvoltage protection circuit will be described first for a better understanding of the present invention.

Figure 1:
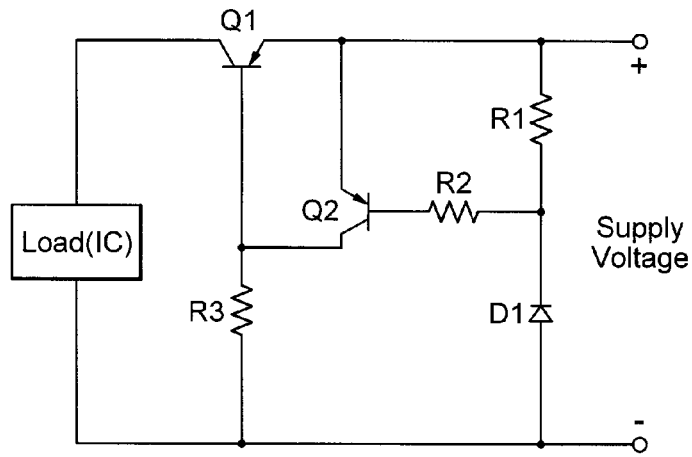
FIG. 1 is a view schematically showing a configuration of a conventional overvoltage protection circuit.

FIG. 1 is a view schematically showing a configuration of the conventional overvoltage protection circuit.

As shown in FIG. 1, the conventional overvoltage protection circuit is a series-parallel combination circuit of first and second PNP bipolar junction transistors (BJT) Q1 and Q2, a zener diode D1, and first to third resistors R1, R2, and R3.

The conventional overvoltage protection circuit configured as above blocks a power voltage from being transmitted to a load (IC) when a voltage higher than a specific voltage (for example, 5V) is applied to a circuit. At this time, the first transistor Q1 plays a role of a cutoff switch. The second transistor Q2 adjusts a switching operation of the first transistor Q1 according to the input voltage. That is, when the input voltage is higher than a certain level, the first transistor Q1 is turned off, and when the input voltage is a value within the appropriate range, the first transistor Q1 is turned on.

Meanwhile, when an overvoltage is input, a cathode of the zener diode D1 maintains Vz even when the overvoltage is input, and a collector current of the second transistor Q2 is increased to turn off the first transistor Q1.

However, since the conventional overvoltage protection circuit depends on the zener diode D1 as shown above, it is difficult to precisely control the overvoltage. Further, the BJTs Q1 and Q2 and the zener diode D1 have a relatively large volume, and in many cases, they are not provided in a semiconductor manufacturing process or an additional mask layer is needed even if they are provided. Thus, characteristics of the circuit are deteriorated and costs increase.

The present invention has been invented in order to overcome the above-described problems and it is, therefore, an object of the present invention to provide an overvoltage protection circuit that can be simply implemented in an IC and safely protect a circuit from an overvoltage by precisely controlling the overvoltage input from the outside, and a method thereof.

Figure 2:
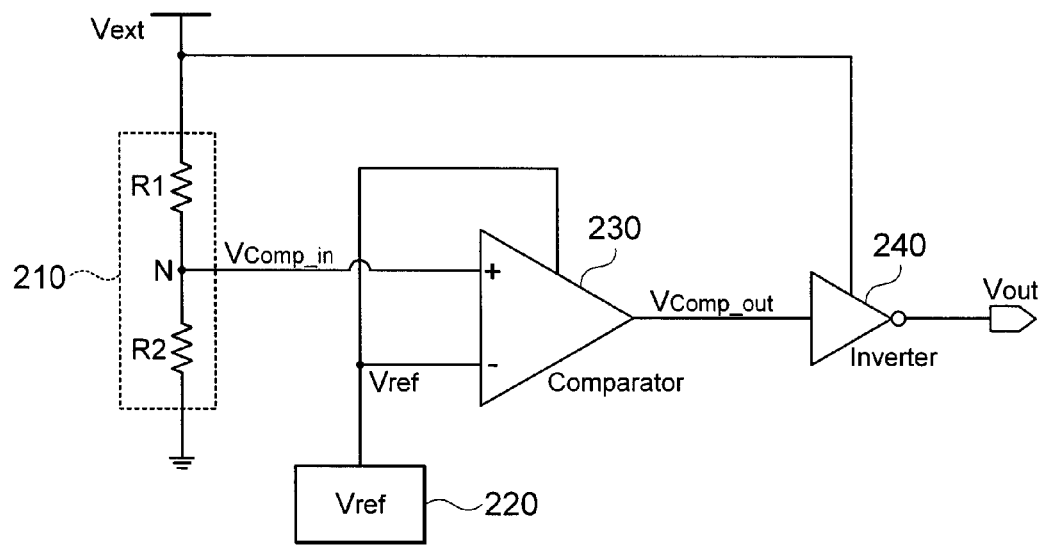
FIG. 2 is a view schematically showing a configuration of an overvoltage protection circuit in accordance with an embodiment of the present invention.

FIG. 2 is a view schematically showing a configuration of an overvoltage protection circuit in accordance with an embodiment of the present invention.

Referring to FIG. 2, the overvoltage protection circuit in accordance with the present invention includes a resistor divider 210, a reference voltage supply unit 220, a comparator 230, and an inverter 240.

The resistor divider 210 consists of a plurality of resistors, receives a voltage from an external power supply Vext, drops the received voltage, divides the dropped voltage into the voltages having a relatively smaller size than a power voltage, and provides the divided voltage. Here, as shown, the resistor divider 210 may consist of a first resistor R1 of which one end is connected to the external power supply Vext and the other end is connected to a common mode N for voltage division and a second resistor R2 of which one end is connected to the common mode N and the other end is connected to a ground GND.

The reference voltage supply unit 220 supplies a preset reference voltage having a certain size. Here, it is preferred that the reference voltage supply unit 220 supplies a stable reference voltage Vref of which a voltage level does not change according to temperature and external environment. Therefore, a band-gap reference (BGR) voltage generator may be used as the reference voltage supply unit 220. Further, the reference voltage supply unit 220 may be configured to be supplied with the reference voltage Vref from the outside.

The comparator 230 receives and compares the voltage Vcomp_in divided and provided by the resistor divider 210 and the reference voltage Vref supplied from the reference voltage supply unit 220 and outputs a low or high signal according to the result of the comparison. Here, the comparator 230 may be configured to receive and compare the voltage Vcomp_in (external voltage) provided by the resistor divider 210 and the reference voltage Vref supplied from the reference voltage supply unit 220, output the low signal when the external voltage Vcomp_in is lower than the reference voltage Vref, and output the high signal when the external voltage Vcomp_in is higher than the reference voltage Vref. Here, further, as shown, Vref is used as a power voltage of the comparator 230 to protect a circuit. When an output of the comparator 230 is high, as the high signal is limited to Vref, in the present invention, the following inverter 240 does not have a typical inverter structure but has an inverter structure as in FIG. 3.

Figure 3:
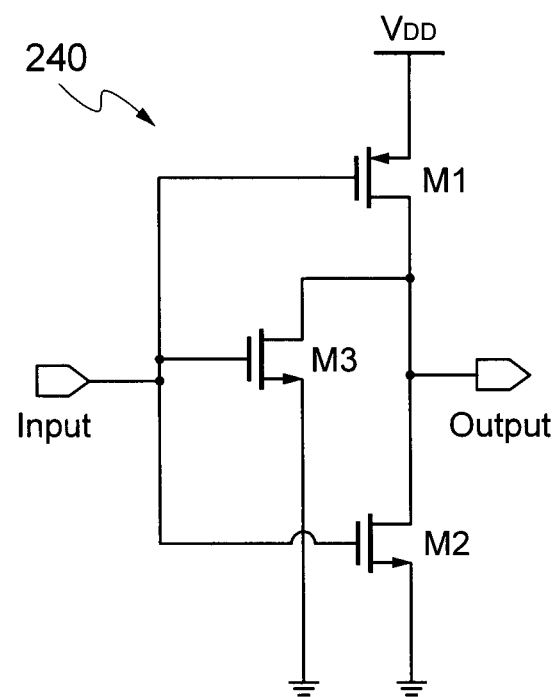
FIG. 3 is a view showing an internal circuit configuration of an inverter in the overvoltage protection circuit of FIG. 2.

The inverter 240 receives the output signal (low or high signal) of the comparator 230 and outputs a signal (high or low signal) opposite to the output signal of the comparator 230. Here, the inverter 240, as shown in FIG. 3, includes a first semiconductor switching element M1 having one side electrode terminal (drain terminal) connected to an external power supply $V_{DD}$ and driven by receiving the output of the comparator 230 through a gate terminal thereof; a second semiconductor switching element M2 connected to the first semiconductor switching element M1 in series and driven by receiving the output of the comparator 230 through a gate terminal thereof; and a third semiconductor switching element M3 provided between the first semiconductor switching element M1 and the second semiconductor switching element M2 to be connected to the first semiconductor switching element M1 in parallel to the second semiconductor switching element M2 and driven by receiving the output of the comparator 230 through a gate terminal thereof.

Further, the inverter 240 is configured to protect an internal circuit from an external overvoltage by receiving the output of the comparator 230 and driving the first semiconductor switching element M1 and the second semiconductor switching element M2 or the third semiconductor switching element M3 to output the external voltage when the external voltage is within the range of the voltage required for the internal circuit and flow the external voltage to the ground GND and thus make the voltage supplied to the internal circuit 0(zero)V when the external voltage is a voltage (overvoltage) higher than the required voltage for the internal circuit. The input voltage high signal of the inverter 240 is limited to the reference voltage Vref. Since it is a signal lower than VDD of the inverter 240, a circuit having a structure of FIG. 3 is needed. This is because it is impossible to turn off the first semiconductor switching element M1 in the high input. Therefore, at this time, through the third semiconductor switching element M3, the output can be converted into low when the third semiconductor switching element M3 is turned on in the high input.

Here, the first to third semiconductor switching elements M1, M2, and M3 which constitute the inverter 240 may be field effect transistors (FET).

Preferably, the first to third semiconductor switching elements M1, M2, and M3 are metal-oxide semiconductor field effect transistors (MOSFET).

Further, preferably, the first semiconductor switching element M1 is a high voltage MOSFET. This is to endure an impact when a high external power voltage is applied.

Then, hereinafter, an operation of the overvoltage protection circuit of the present invention having the above configuration and an overvoltage protection method by the overvoltage protection circuit of the present invention will be described.

Figure 4:
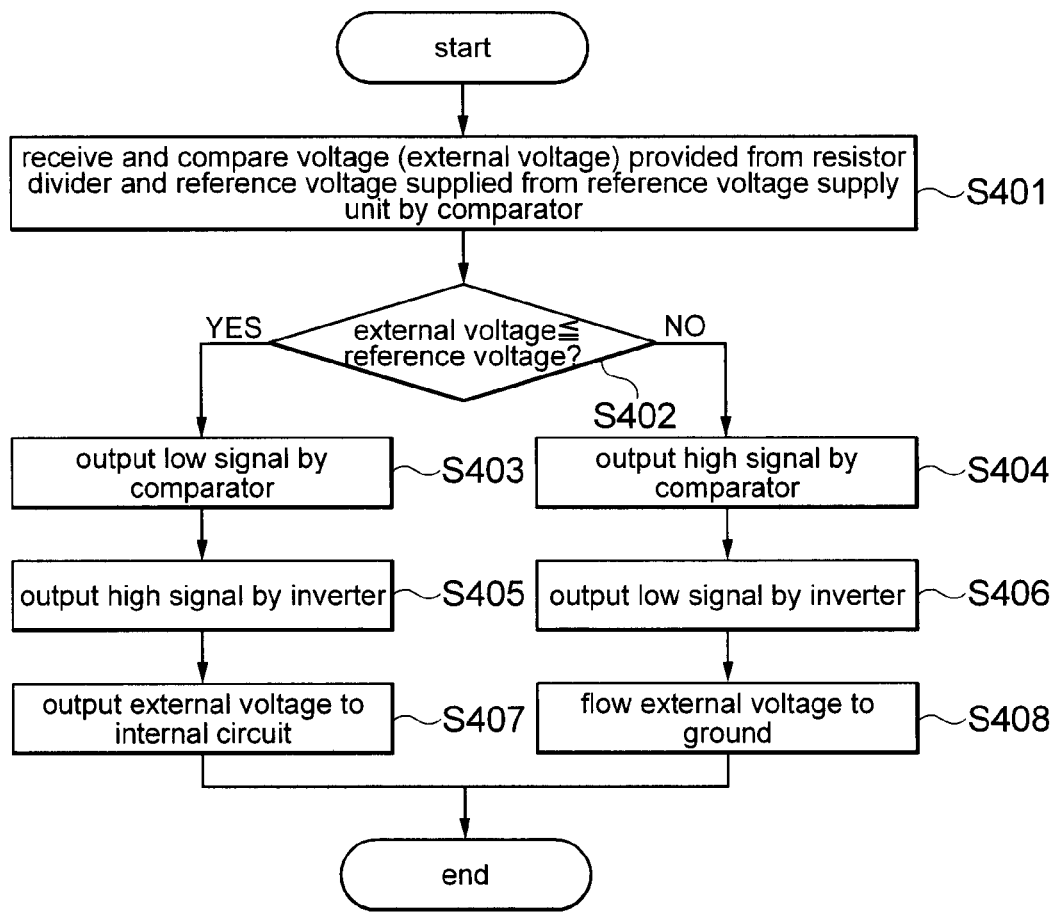
FIG. 4 is a view showing a process of executing an overvoltage protection method in accordance with an embodiment of the present invention.

FIG. 4 is a flowchart showing a process of executing an overvoltage protection method in accordance with an embodiment of the present invention.

Referring to FIG. 4, the overvoltage protection method in accordance with the present invention, which is an overvoltage protection method using the above-described overvoltage protection circuit including the resistor divider 210, the reference voltage supply unit 220, the comparator 230, and the inverter 240, first, receives and compares a voltage (external voltage) provided from the resistor divider 210 and a reference voltage Vref supplied from the reference voltage supply unit 220 by the comparator (S401 and S402).

And, according to the result of the comparison, a low or high signal is output from the comparator 230. For example, when the external voltage is lower than the reference voltage in the result of the comparison of the step S402, the comparator 230 outputs the low signal (S403), and when the external voltage is higher than the reference voltage, the comparator 230 outputs the high signal (S404).

When the high or low signal is output from the comparator 230 in this way, the inverter 240 receives the output signal (low or high) of the comparator 230 and outputs a signal (high or low) opposite to the output signal of the comparator 230 (S405 and S406).

And, when the high signal is output from the inverter 240, the external voltage is output to an internal circuit by determining that the external voltage is within the range of the voltage required for the internal circuit (S407). At this time, the inverter 240 outputs the external voltage to the internal circuit by driving a first semiconductor switching element M1 and a second semiconductor switching element M2 inside thereof.

Further, when the low signal is output from the inverter 240, the external voltage is determined as a voltage (overvoltage) higher than the voltage required for the internal circuit and flows to a ground (S408). That is, the voltage supplied to the internal circuit becomes 0(zero)V. This means that the external voltage is cut off not to be supplied to the internal circuit. By this, the internal circuit is protected from the external overvoltage.

At this time, the inverter 240 drives the first semiconductor switching element M1 and a third semiconductor switching element M3 inside thereof to flow the external voltage to the ground and thus make the voltage supplied to the internal circuit 0(zero)V.

Here, a practical example of the overvoltage protection circuit and the method thereof will be described in full detail with reference to FIGS. 5 and 6.

Figure 5:
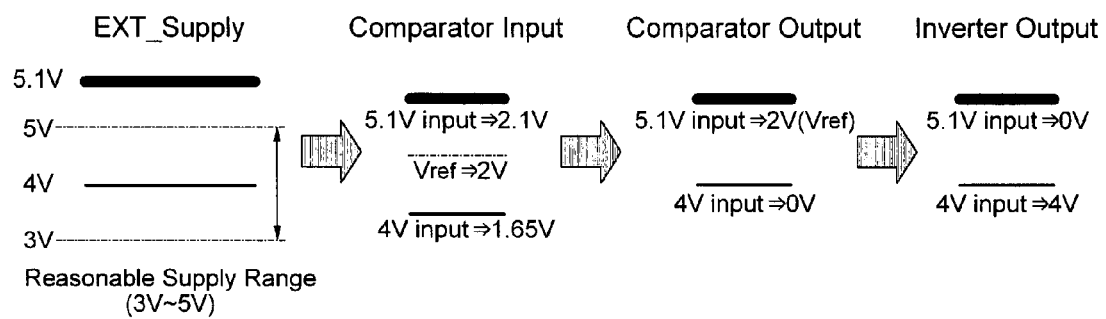
FIG. 5 is a view schematically explaining an operation of the overvoltage protection circuit in accordance with the present invention.
Figure 6:
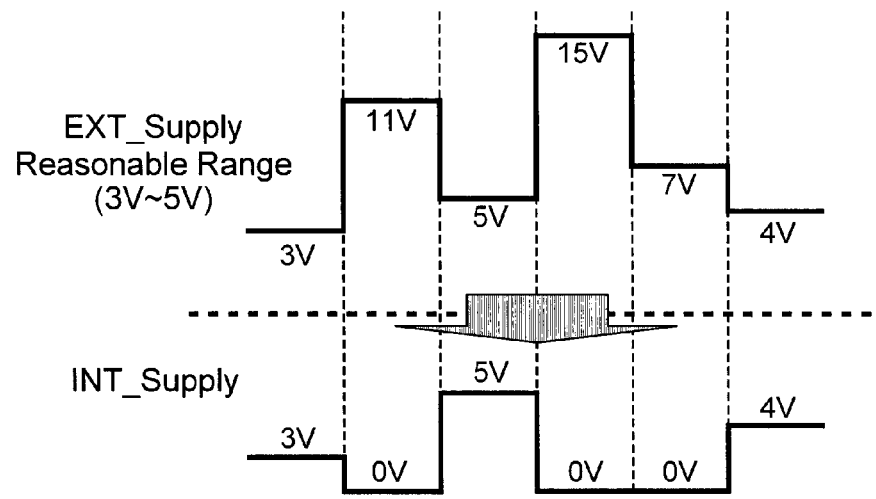
FIG. 6 is a view showing a relation of an internal power voltage when an external power voltage varies in the overvoltage protection circuit in accordance with the present invention.

FIG. 5 is a view schematically explaining an operation of the overvoltage protection circuit in accordance with the present invention, and FIG. 6 is a view showing a relation of an internal power voltage when an external power voltage varies.

Referring to FIGS. 5 and 6, suppose that the overvoltage protection circuit is a circuit that operates at 3V to 5V. That is, suppose that the overvoltage protection circuit is a circuit that determines as an overvoltage when the voltage exceeding 5V is input and thus does not generate an output. Further, suppose that the reference voltage Vref supplied from the reference voltage supply unit 220 is arbitrarily 2V. An output Vcomp_in of the resistor divider 210 is set to less than 2V when the external power voltage Vext of less than 5V is input, and the output Vcomp_in of the resistor divider 210 is set to exceed 2V when the external power voltage Vext exceeds 5V. For example, when the first resistor R1=14.3 Kohm and the second resistor R2=10 Kohm, the above operation can be performed.

Then, suppose that 4V, a voltage within the range determined as the external power voltage Vext is input. Then, the output of the resistor divider 210 will be a voltage of 1.65V which is lower than 2V which is the reference voltage Vref. Therefore, the output of the comparator 230 becomes low. Accordingly, since the inverter 240 at a rear end outputs a signal opposite to the input signal, the inverter 240 outputs a high signal by receiving the low signal. At this time, since a power voltage of the inverter 240 is a voltage supplied from the outside, the output voltage of the inverter, that is, the power voltage INT_Supply that is finally supplied to the internal circuit becomes the power voltage EXT_Supply (that is, 4V) supplied from the outside.

Now, the operation of the overvoltage protection circuit when the overvoltage is supplied, that is, when the voltage exceeding 5V is supplied will be described. For example, suppose that 5.1V is supplied as the power voltage EXT_Supply supplied from the outside. In this case, since the output of the resistor divider 210 is 2.1V, the comparator 230 outputs the high signal and thus the output of the inverter 240 becomes low. When the output of the inverter 240 is low like this, in the circuit of FIG. 3, the inverter 240 drives the first semiconductor switching element M1 and the third semiconductor switching element M3 inside thereof to flow the external voltage to the ground. As a result, the voltage supplied to the internal circuit becomes 0(zero)V. Since 0V is supplied to the internal circuit like this when the overvoltage is input, it is possible to protect the circuit from the overvoltage.

As described above, since the overvoltage protection circuit in accordance with the present invention does not use components such as a zener diode or a BJT, it has a relatively smaller volume than the structure of the conventional overvoltage protection circuit, can be implemented in an IC, and can prevent an increase in process costs due to the zener diode or the BJT.

Further, the conventional overvoltage protection circuit has a relatively large variation of an overvoltage protection interval due to characteristics of the zener diode and the BJT, but since the overvoltage protection circuit of the present invention does not use those components, it can perform a very precise overvoltage protection function and consequently protect the circuit safely from the overvoltage.

According to the present invention, the overvoltage protection circuit can be simply implemented in an IC and safely protect a circuit from an overvoltage by precisely controlling the overvoltage input from the outside.

Although the preferable embodiments of the present invention have been described in detail above, the present invention is not limited to the embodiments and it will be appreciated by those skilled in the art that various modifications and applications may be made in the embodiments without departing from the technical spirit of the present invention. Therefore, the range of protection of the present invention should be interpreted from the appended claims and all technical sprits within the range equivalent to the range should be interpreted as being included in the range of the rights of the present invention.

What is claimed is:

1. An overvoltage protection circuit comprising:
    a resistor divider consisting of a plurality of resistors, receiving a voltage from an external power supply, dropping the received voltage, dividing the dropped voltage into the voltages having a relatively smaller size than a power voltage, and providing the divided voltage;
    a reference voltage supply unit for supplying a preset reference voltage having a certain size;
    a comparator for receiving and comparing the voltage divided and provided by the resistor divider and the reference voltage supplied from the reference voltage supply unit and outputting a low or high signal according to the result of the comparison; and
    an inverter for receiving the output signal (low or high) of the comparator and outputting a signal (high or low) apposite to the output signal of the comparator, wherein the inverter comprises:
    a first semiconductor switching element having one side electrode terminal connected to the external power supply and driven, by receiving the output of the comparator;
    a second semiconductor switching element connected to the first semiconductor switching element in series and driven by receiving the output of the comparator; and
    a third semiconductor switching element provided between the first semiconductor switching element and the second semiconductor switching element to be connected to the first semiconductor switching element in parallel to the second semiconductor switching element and driven by receiving the output of the comparator, wherein the first semiconductor switching element and the second semiconductor switching element or the third semiconductor switching element are driven by receiving the output of the comparator, output the external voltage when the external voltage is within the range of the voltage required for an internal circuit, and flow the external voltage to a ground and thus make the voltage supplied to the internal circuit 0(zero)V to protect the internal circuit from an external overvoltage when the external voltage is a voltage (overvoltage) higher than the required voltage for the internal circuit;
    wherein the external voltage is within the range of the voltage required for the internal circuit, the second semiconductor switching element and the third semiconductor switching element are turned off with turning on the first semiconductor switching element, and
    wherein the external voltage is the voltage (overvoltage) higher than the voltage required for the internal circuit, the second semiconductor switching element and the third semiconductor switching element are turned on without turning of the first semiconductor switching element.

2. The overvoltage protection circuit according to claim 1, wherein the resistor divider consists of a first resistor of which one end is connected to the external power supply and the other end is connected to a common mode for voltage division and a second resistor of which one end is connected to the common mode and the other end is connected to the ground.

3. The overvoltage protection circuit according to claim 1, wherein the reference voltage supply unit is a hand-gap reference (BGR) voltage generator.

4. The overvoltage protection circuit according to claim 1, wherein the comparator receives and compares the voltage (external voltage) provided by the resistor divider and the reference voltage supplied from the reference voltage supply unit, outputs the low signal when the external voltage is lower than the reference voltage, and outputs the high signal when the external voltage is higher than the reference voltage.

5. The overvoltage protection circuit according to claim 1, wherein the first to third semiconductor switching elements are field effect transistors (PET).

6. The overvoltage protection circuit according to claim 5, wherein the first to third semiconductor switching elements are metal-oxide semiconductor field effect transistors (MOSFET).

7. The overvoltage protection circuit according to claim 6, wherein the first semiconductor switching element is a high voltage MOSFET.

8. An overvoltage protection circuit using an overvoltage protection circuit comprising a resistor divider, a reference voltage supply unit, a comparator, and an inverter, comprising:
  (a) receiving and comparing a voltage (external voltage) provided by the resistor divider and a reference voltage supplied from the reference voltage supply unit by the comparator;
  (b) outputting a low or high signal according to the result of the comparison by the comparator;
  (c) receiving the output signal (low or high) of the comparator and outputting a signal (high or low) opposite to the output signal of the comparator by the inverter;
  (d) outputting the external voltage to an internal circuit by determining that the external voltage is within the range of the voltage required for the internal circuit when the high signal is output from the inverter; and
  (e) flowing the external voltage to a ground to make the voltage supplied to the internal circuit 0(zero)V by determining the external voltage as a voltage (overvoltage) higher than the voltage required for the internal circuit when the low signal is output from the inverter,
  wherein the inverter comprises a first semiconductor switching element, a second semiconductor switching element, and a third semiconductor switching element,
  wherein, in step (d), the second semiconductor switching element and the third semiconductor switching element are turned off with turning on the first semiconductor switching element, and
  wherein, in step (e), the second semiconductor switching element and the third semiconductor switching element are turned on without turning off the first semiconductor switching element.

9. The overvoltage protection method according to claim 8, wherein in the step (b), as a result of the comparison, the comparator outputs the low signal when the external voltage is lower than the reference voltage and outputs the high signal when the external voltage is higher than the reference voltage.

* * * * *